May 7, 1940. W. WOOD, JR 2,199,811

PROCESS OF MAKING A TOP LIFT SLAB

Filed Nov. 26, 1937

INVENTOR
WILLIAM WOOD, JR.,
BY
Louis H. Caneau,
ATTORNEY.

Patented May 7, 1940

2,199,811

UNITED STATES PATENT OFFICE 2,199,811

PROCESS OF MAKING A TOP LIFT SLAB

William Wood, Jr., Vancouver, British Columbia, Canada

Application November 26, 1937, Serial No. 176,497

1 Claim. (Cl. 154—2)

My invention relates to a process of making a top lift slab.

As is well known, top lifts of rubber composition are now extensively used, so much so that for purposes of economy the lifts are often stamped or punched out from slabs, rather than moulded. Where the lift is intended for women's covered heels, that is, heels having a covering of some material, the lift should have its face which engages the heel or more particularly the heel covering, as smooth as possible, in order to prevent the covering from working out from under the heel and wrinkling or puckering. In fact, a smooth upper face in a rubber top lift to be used on covered heels is now almost a requisite in the trade.

A slab from which lifts may be stamped out has been produced, this slab comprising a tread member of some rubber composition, to one face of which is adhered a thin layer or sheet of some fibre material; the slab thus has a fairly smooth face. While this slab is to some extent satisfactory, in that it provides a smooth face which reduces to a great extent the friction between the lift and the heel covering, it is not entirely satisfactory, and is, in fact, objectionable, for the reason that the bond between the sheet and the rubber composition is easily affected by wetness. Moreover, this slab is only available with a very thin sheet or backing of fibre, and even then the fibre is apt to pull away from the rubber when the lifts are being stamped out. As wetness affects the bond, and in some cases will entirely destroy the same, fibre fastened by the present methods to a smooth surface, or even to a rough or uneven surface, does not hold to the rubber, and does not, therefore, prevent the rubber from spreading out. In other words, when a lift is stamped out from this slab and fastened to the heel, it soon spreads out beyond the edges of the heel, becoming unsightly and causing the corners of the heel to break off or become damaged, since, as is known, rubber lacks rigidity.

I have now devised a material in slab form from which an entirely satisfactory top lift may be easily stamped out, the slab comprising a tread member of rubber composition and a rigid back or upper member intimately adhered to the rubber member, and having a smooth upper face; and a process for producing such slab.

The objects of my invention, therefore, are to provide a slab of rubber composition having a rigid back or base member intimately adhered thereto, one of whose exposed faces is smooth, and from which top lifts may be easily stamped out.

Another object of my invention is to provide a process for intimately binding or adhering a slab of rubber composition to a rigid fibre member, the bond being such that it is not affected by such conditions of dryness, wetness, or temperature as a lift is normally subjected to when in use.

My process will now be described, reference being made to the drawing, wherein

Figure 1:
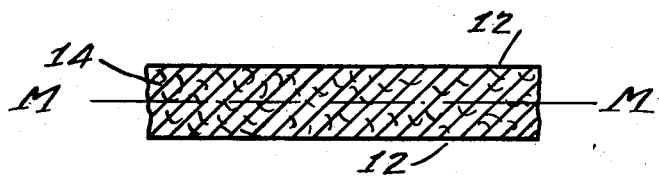
Figure 1 is a fragmentary, longitudinal cross section of a slab of compressed fibres having smooth opposite faces.
Figure 2:
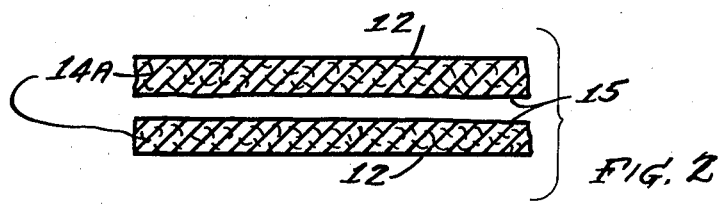
Figure 2 is a view similar to Figure 1, after the slab or sheet has been split longitudinally to provide two separate pieces or slabs.
Figure 3:
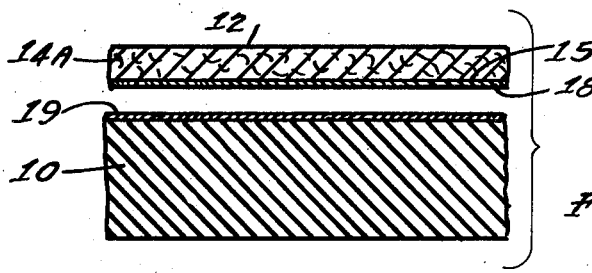
Figure 3 shows one of the pieces disclosed in Figure 2 and a slab of rubber composition, both coated and placed face to face before being brought and pressed together.
Figure 4:
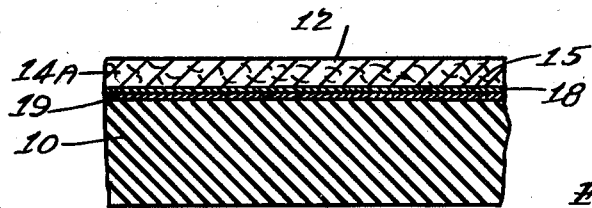
Figure 4 shows the unit or single slab after its component members have been adhered together into an intimate or single unit.

The complete slab comprises a tread member 10 of rubber composition, suitable for top lifts, and a rigid member or base 14A intimately adhered thereto and provided with a smooth upper face 12. The lift L, when stamped out from the slab, is applied to the heel block B with its upper smooth face 12 next to the heel, and secured to the heel as with, say nails (not shown).

A number of sheets of paper are first rolled into a vulcanized fibre board 14, and calendered. Preferably, I use an uneven number of such sheets of the same properties, except for the middle or centre sheet which consists of a hard sheet of paper. The opposite faces 12 of the slab are thus relatively smooth, at least sufficiently smooth so as not to develop any appreciable friction against the heel covering F. It is found also that the centre ply is soft and can be split, since the hard and less porous paper does not absorb as much of the solution as do the other sheets of paper. The slab is then split longitudinally, through the centre ply, as on a line M—M, to provide two substantially equal pieces or sheets 14A, the opposite faces 12 of which are smooth and the adjacent faces 15 of which are porous and uneven.

Figure 5:
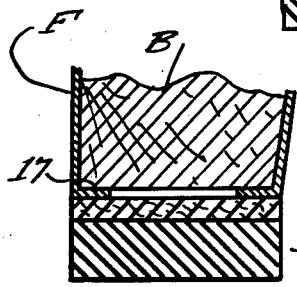
Figure 5 is a fragmentary cross section of a typical covered heel for women's shoes, with a lift, such as may be stamped out from my slab, secured thereto.

The sheet 14A should preferably be of such thickness, or be otherwise so rigid, that when forming part of the lift complete, the lift will substantially resist bending when subjected to a bending strain such as may be imposed upon it when in use. It will be noticed, by reference to Figure 5, that a lift, when applied to the block, does not bear against the whole surface of the block, but only on the turned-in portions 17 of the covering F, so that the lift has a tendency to bend at the centre toward the block. Therefore, it is much desirable that the lift should be stiff or rigid as aforesaid.

In practice, I use fifteen plies, fourteen of which are of 75 lb. paper, 7/1000" thick, the whole calendered 10%, and having a density of 1.3. The middle or centre sheet is, as already stated, made of a paper which is harder and less porous than the other sheets.

The face 15 of the sheet 14A which is to be applied to the sheet of rubber composition is coated with a layer of latex as at 18, and then the sheet is allowed to dry for, say two hours or more, under a gentle heat. The sheet of rubber composition 10, of a size say equal to that of the member 14A, and of the desired thickness, is coated on one side with rubber cement, as at 19, and then the slab is allowed to dry for, say about an hour. Both members 10 and 14A are then applied one to the other, with their coated faces one adjacent the other, and the members are then pressed together, say by rolling or other operation, which results in both members being secured or adhered together by a bond which for practical purposes, endures under all conditions of temperature, dryness or wetness.

With a fibre member split as described and adhered to rubber composition by a bond which is not affected by such conditions of temperature, dryness or wetness to which a lift is normally subjected, the rubber does not stretch or spread beyond the edges of the heel block, and by using a rigid fibre member, to impart rigidity to the lift as a whole, the corners of the block do not break off or become damaged.

Heretofore, no process has been known by which a rigid, or a multiply fibre board, could be adhered to a sheet of rubber composition by a bond which is not affected by such conditions of temperature, wetness or dryness as a fibre-rubber lift is normally subjected to when in use.

By vulcanized fibre board is meant a material made by compressing layers of paper treated with acids or zinc-chloride.

What I claim is:

A step in the process of preparing a vulcanized fibre board for bonding to rubber, which comprises assembling an even number of sheets of paper of substantially the same properties on both faces of a sheet of paper which is harder and less porous than the other sheets, subjecting the composite to a vulcanizing solution whereby during vulcanization said harder and less porous sheet absorbs less of the vulcanizing solution than the other sheets and is relatively softer than the other sheets after vulcanization of the board, calendering the so-treated sheets into a composite slab, and splitting said slab longitudinally in a plane passing through said softer, less vulcanized sheet to provide two substantially equal pieces having one smooth face and one which is porous and uneven.

WILLIAM WOOD, Jr.